(12) United States Patent
Mashimo

(10) Patent No.: US 7,477,585 B2
(45) Date of Patent: Jan. 13, 2009

(54) ERROR CORRECTION DEVICE AND OPTICAL DISK DEVICE

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 720 days.

(21) Appl. No.: 11/185,647

(22) Filed: Jul. 19, 2005

(65) Prior Publication Data

US 2006/0018230 A1    Jan. 26, 2006

(30) Foreign Application Priority Data

Jul. 23, 2004    (JP)    ............................. 2004-215146

(51) Int. Cl.
*G11B 20/18*    (2006.01)
*G11B 27/19*    (2006.01)

(52) U.S. Cl. .................. 369/53.35; 369/59.23

(58) Field of Classification Search .............. None
See application file for complete search history.

(56) References Cited

U.S. PATENT DOCUMENTS

| | | | | |
|---|---|---|---|---|
| 5,828,676 | A * | 10/1998 | Hurlbut et al. .............. | 714/752 |
| 6,765,972 | B1 | 7/2004 | Kawasaki | |
| 2002/0186644 | A1 * | 12/2002 | Kim et al. .............. | 369/124.12 |
| 2003/0161234 | A1 * | 8/2003 | Eom ........................ | 369/47.28 |
| 2004/0252606 | A1 * | 12/2004 | Noda et al. .............. | 369/47.27 |
| 2004/0252607 | A1 * | 12/2004 | Muzio et al. ............. | 369/47.27 |
| 2006/0133291 | A1 * | 6/2006 | Kim et al. .................... | 370/252 |

FOREIGN PATENT DOCUMENTS

| | | |
|---|---|---|
| JP | 8-77715 A | 3/1996 |
| JP | 11-252055 | 9/1999 |
| JP | 2001-045083 | 2/2001 |
| JP | 2004-46989 | 2/2004 |
| JP | 2004-71153 | 3/2004 |

OTHER PUBLICATIONS

"Essentials of Next Generation Optical Disk," Excerpt from Nikkei Electronics Books, Nikkei Business Publications, Inc., Tokyo, Oct. 7, 2003, pp. 106-108.

(Continued)

*Primary Examiner*—Christopher R Lamb
(74) *Attorney, Agent, or Firm*—Christensen O'Connor Johnson Kindness PLLC

(57) ABSTRACT

An optical disk device which drives HD-DVD or the like. In an HD-DVD type optical disk, address information is embedded in four wobble waves having the same phase. A wobble signal is detected by an optical pickup and demodulated by an address decoding circuit. The address decoding circuit detects an amount of phase difference of the wobble signal. The system controller sets an error flag in a bit in which the detected amount of phase difference exceeds a predetermined range. When a reading error is determined by means of CRC or the like, bit data replacement is performed with regard to the bit in which an error flag has been set, thereby correcting the error.

16 Claims, 10 Drawing Sheets

OTHER PUBLICATIONS

Notice of Grounds for Rejection (JP) dated Nov. 13, 2007, issued in corresponding Japanese Application No. 2004-215146.
First Examination Report for China Patent Application dated Oct. 26, 2007, issued in corresponding Chinese Application No. 200510084757.4.
Notice of Grounds for Rejection (JP) dated March 18, 2008, issued in corresponding Japanese Application No. 2004-215146.
Decision of Final Rejection (JP) dated Jun. 10, 2008, issued in corresponding Japanese Application No. 2004-215146.
"Next Generation DVD Specification HD DVD," *Nikkei Electronics/Nikkei BP*, Oct. 13, 2003, pp. 126-134 with partial English translation.
Office Action/Notice of Grounds for Rejection of Jul. 10, 2007, related to JP Application No. 2004-215146.

* cited by examiner

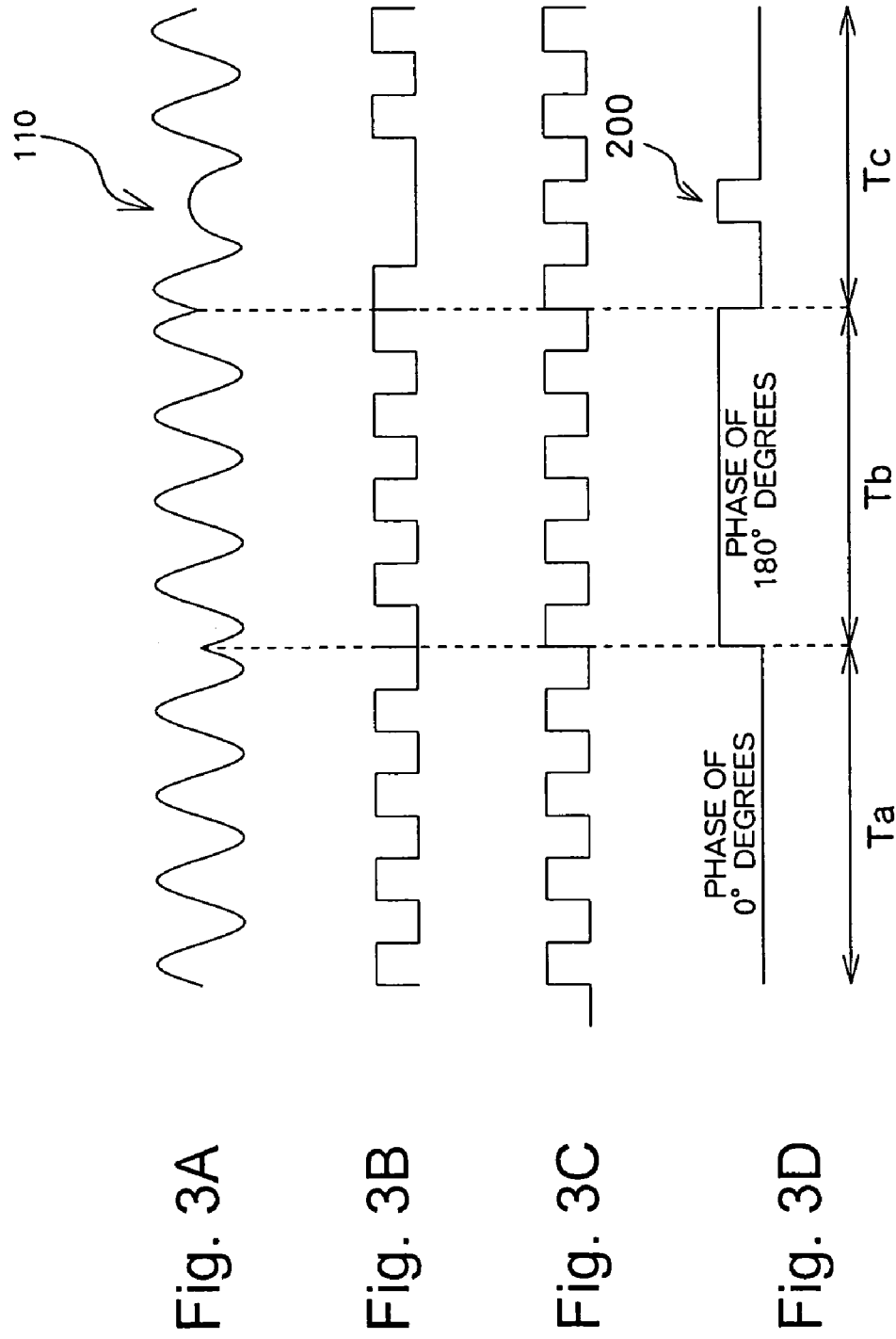

Fig. 4A
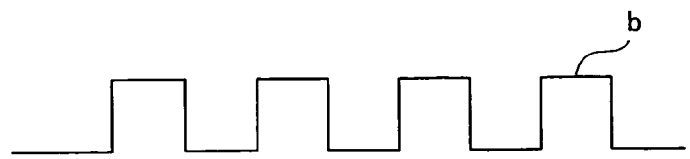
Fig. 4B
Fig. 4C
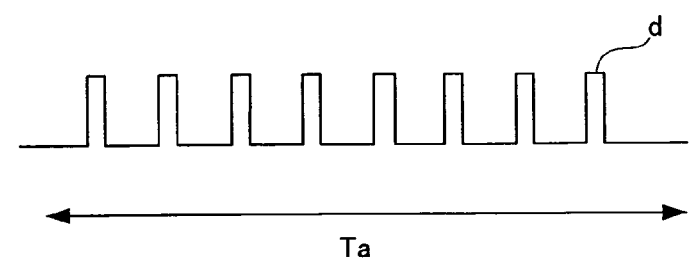
Ta
Fig. 5A
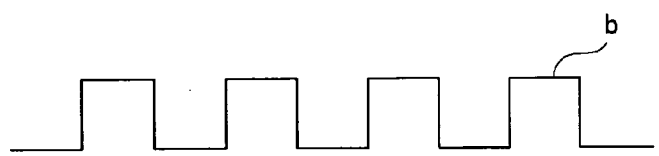
Fig. 5B
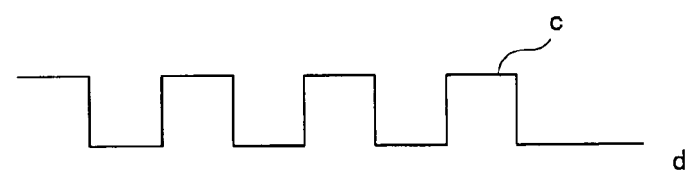
Fig. 5C
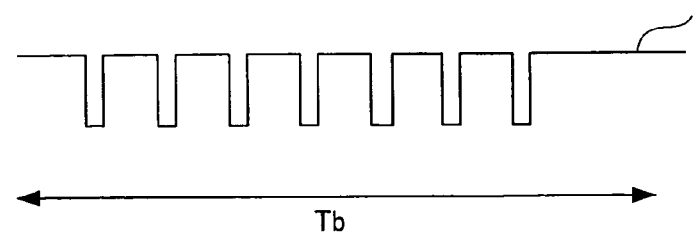
Tb

ERROR CORRECTION DEVICE AND OPTICAL DISK DEVICE

BACKGROUND OF THE INVENTION

1. Field of the Invention

The present invention relates to an error correction device and an optical disk device, and more particularly to error correction of data which is expressed using phase modulation.

2. Description of Related Art

HD (High-Definition) DVDs have been proposed in recent years as next generation DVDs. It is intended that the HD-DVDs adopt the disk structure of the current DVDs so as to ensure compatibility therewith, while simultaneously achieving higher density data recording than that of the previous generation DVDs.

As one main feature, HD-DVDs adopt the land/groove recording method in which information is recorded in both lands and grooves. Land tracks and groove tracks are formed in wobbles, in which address information is embedded. More specifically, address information is expressed using phase modulation in such a manner that four waves having a phase of 0 degrees represent "0" and four waves having a phase of 180 degrees represent "1". Here, a plurality of, in this case, four, waves with the same phase are provided in order to increase the accuracy of address information detection by means of redundancy. For the address information to be embedded in the form of wobbles, binary data are converted into a gray code in which the distance between codes (inter-code distance) for adjacent sets of binary data, that is, the number of inverted bits, is equal to 1. Accordingly, in gray code, address "0" is represented as "00000000"; address "1" is represented as "00000001"; address "2" is repented as "00000011"; address "3" is represented as "00000010"; address "4" is represented as "00000110", and so on.

On the other hand, it is also possible that the address information is embedded by forming grooves in wobbles and data is recorded or reproduced with respect to only grooves. In this case, as it is not necessary to provide the address information to lands, the need for converting the address information into gray code before being embedded is eliminated. It is also possible to add check bits for CRC (Cyclic Redundancy Check) or CRC bits to the address information of the grooves. When data is recorded only in grooves, the address information is also expressed using phase modulation in such a manner that four waves having a phase of 0 degrees represent bit data "0" and four waves having a phase of 180 degrees represent bit data "1", in the same manner as in the land/groove recording. Here, four waves having identical phases are used to express one-bit data both in an optical disk in which data is recorded in grooves and lands and in an optical disk in which data is recorded in grooves only, in order to allow both types of optical disks to be driven by a single optical disk device. As such, it is possible to enable a single disk device to drive both "HD DVD-R" (write-once or Recordable) which is an optical disk in which data is recorded in grooves only and "HD DVD-RW" (Rewritable) which is an optical disk in which data is recorded in grooves and lands. Such HD-DVDs are generally described in the Oct. 13, 2003 issue of "Nikkei Electronics" (Nikkei B P, Oct. 13, 2003, pp. 126-134).

As described above, the address information is expressed by means of phase modulation in such a manner that four waves having a phase of 0 degrees represent a bit value "0" and four waves having a phase of 180 degrees represent a bit value of "1", and the bit value of "0" or "1" can be determined basically according to the principle of majority rule. More specifically, when three waves having a phase of 0 degrees and only one wave having a phase of 180 degrees are detected for one bit, the bit value can be determined to be "0".

However, even when three waves having a phase of 0 degrees are detected, there is no guaranteeing that the bit data is truly "0". It is therefore desirable to further increase the detection accuracy. Further, when two waves having a phase of 0 degrees and two waves having a phase of 180 degrees are detected, i.e. when a half of the four waves represent 0 and the other half of the four waves represent 1, it is not possible to determine which of the data 0 or 1 is represented by such wobbles. Of course, a reading error bit can be determined by performing CRC using CRC bits. With the CRC technique, however, even when 9-bit check bits are added, for example, it is only possible to detect an error in three or less bits. Accordingly, with the CRC technique, it is not possible to correct an error and determine a correct address.

SUMMARY OF THE INVENTION

The present invention provides a device capable of more reliably performing error correction when demodulating data which is expressed by using phase modulation.

In accordance with one aspect of the present invention, there is provided a device for correcting an error of a data value in a modulation method in which a data value is expressed by a first phase and a second phase which is shifted from the first phase by 180 degrees, the device comprising determination means for determining whether or not a phase difference between a modulation signal and a reference signal is outside a predetermined range with respect to the first phase or the second phase; setting means for setting an error flag in a data value for which the phase difference is determined to be outside the predetermined range; and correction means for replacing the data value in which the error flag is set for error correction.

In accordance with another aspect of the present invention, there is provided an optical disk device for recording or reproducing data with respect to grooves of an optical disk in which address information is embedded by forming the grooves in wobbles, the wobbles forming data of one bit by N ($N \geq 2$) waves with the same phase and also by a modulation method in which a data value is expressed by a first phase and a second phase which is shifted from the first phase by 180 degrees, the optical disk device comprising determination means for determining whether or not at least any one of N phase differences between a signal obtained by reproducing the wobbles and a reference signal is outside a predetermined range with respect to the first phase or the second phase; and address correction means for replacing data of a bit in which the phase difference is determined to be outside the predetermined range for correcting the data.

In accordance with a further aspect of the present invention, there is provided an optical disk device for recording or reproducing data with respect to grooves of an optical disk in which address information is embedded by forming the grooves in wobbles, the wobbles forming data of one bit by N ($N \geq 2$) waves with the same phase and also by a modulation method in which a data value is expressed by a first phase and a second phase which is shifted from the first phase by 180 degrees, the optical disk device comprising determination means for determining whether or not an average value of N phase differences between a signal obtained by reproducing the wobbles and a reference signal is outside a predetermined range with respect to the first phase or the second phase; and address correction means for replacing data of a bit in which the phase difference is determined to be outside the predetermined range for correcting the data.

In accordance with still another aspect of the present invention, there is provided an optical disk device for recording or reproducing data with respect to grooves of an optical disk in which address information is embedded by forming the grooves in wobbles, the wobbles forming data of one bit by N (N≧2) waves with the same phase and also by a modulation method in which a data value is expressed by a first phase and a second phase which is shifted from the first phase by 180 degrees, the optical disk device comprising determination means for determining whether or not an added value of N phase differences between a signal obtained by reproducing the wobbles and a reference signal is outside a predetermined range with respect to the first phase or the second phase; and address correction means for replacing data of a bit in which the phase difference is determined to be outside the predetermined range for correcting the data.

BRIEF DESCRIPTION OF THE DRAWINGS

A preferred embodiment of the present invention will be described in detail based on the following drawings, wherein:

FIGS. 3A to 3D are timing charts of a wobble signal;

FIGS. 4A to 4C are detailed timing charts of a wobble signal;

FIGS. 5A to 5C are another detailed timing charts of a wobble signal;

DETAILED DESCRIPTION OF PREFERRED EMBODIMENT

A preferred embodiment of the present invention will be described in detail with reference to the accompanying drawings.

Figure 1:
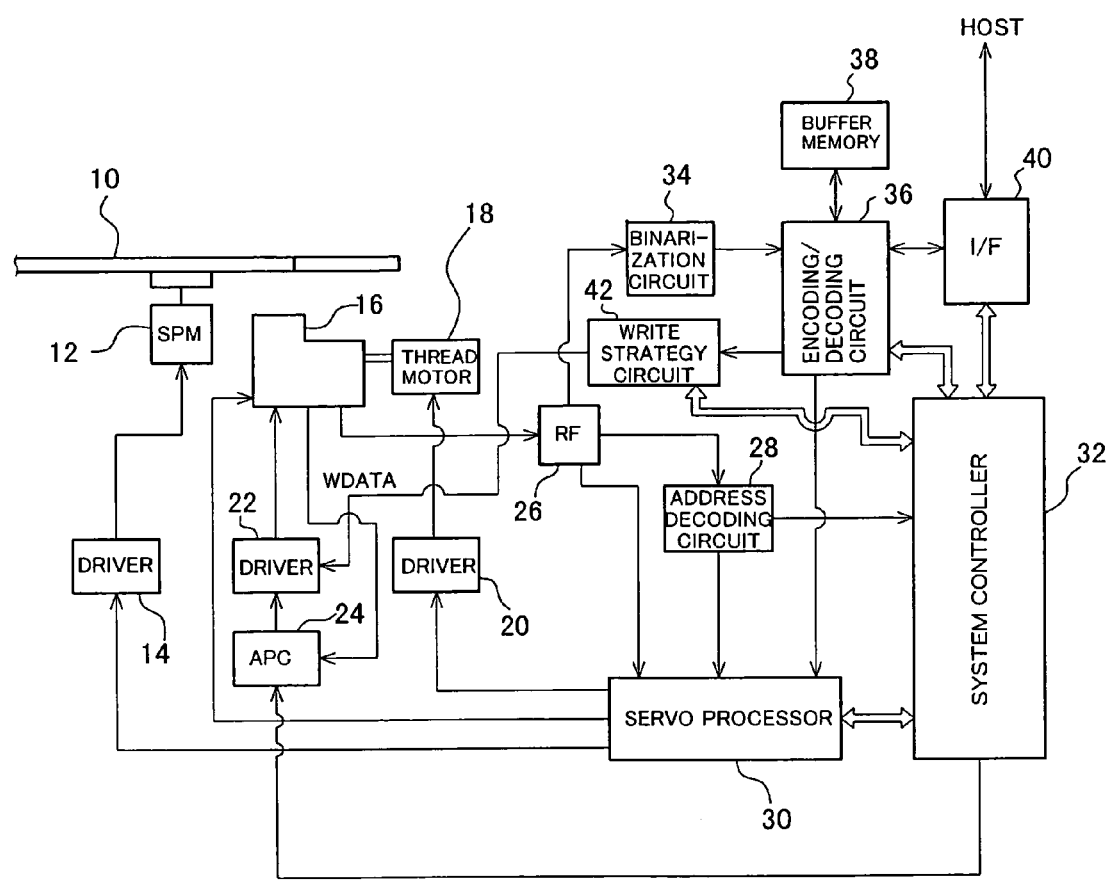
FIG. 1 is a diagram showing the overall structure of an optical disk device according to one embodiment of the present invention.

FIG. 1 shows the overall structure of an optical disk device according to the present embodiment. An optical disk 10 is rotated by a spindle motor (SPM) 12. The spindle motor SPM 12 is in turn driven by a driver 14, which, in turn, is servo-controlled by a servo processor 30 so as to operate at a desired rotation rate. Here, an HD DVD-R is one example of the optical disk 10.

An optical pickup 16, which includes a laser diode (LD) for irradiating laser light onto the optical disk 10 and a photo detector (PD) for receiving and converting light reflected from the optical disk 10 into an electric signal, is disposed opposite the optical disk 10. The optical pickup 16 is driven by a thread motor 18 in the radial direction of the optical disk 10. The thread motor 18 is driven by a driver 20, which is servo-controlled by the servo processor 30 in the same manner as the driver 14. Further, the LD of the optical pick-up 16 is driven by the driver 22, which is controlled by an auto power control circuit (APC) 24 such that a drive current assumes a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power stepwise, and then the test data is reproduced for evaluation of the signal quality, so that the recording power with which the desirable signal quality can be obtained is selected. As an index of signal quality, a β value and a γ value, a degree of modulation, jitter, or the like is used.

When reproducing the data recorded on the optical disk 10, laser light of reproduction power is emitted from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions.

The optical pickup 16 performs recording and reproduction with respect to grooves of the optical disk 10. The grooves are formed helically on the optical disk 10. Further, the RF circuit 26 supplies an address signal contained in the reproduction signal to an address decoding circuit 28. The address decoding circuit 28 demodulates the address signal to obtain address data of the optical disk 10, and supplies the demodulation data to the servo processor 30 and a system controller 32. The address data is embedded in the grooves of the optical disk 10 in the form of wobbles. The optical disk 10 includes a segment address and a track address as the address data. The address data is previously subjected to phase modulation such that four waves having a phase of 0 degrees represent a bit value "0" and four waves having a phase of 180 degrees represent a bit value "1". These four waves having the same phase constitute a redundant system.

The RF circuit 26 supplies a reproduction RF signal to a binarization circuit 34. The binarization circuit 34 binarizes (digitizes as binary data) the reproduced signal and supplies the resulting signal to an encode/decode circuit 36. The binary signal is then subjected to demodulation and error correction in the encode/decode circuit 36 to obtain reproduction data, which is output to a host device, such as a personal computer, via an interface I/F 40. Here, the encode/decode circuit 36 temporarily stores the reproduction data in a buffer memory 38 before outputting the reproduction data to the host device.

For recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as modulation data (ETM (Eight to Twelve Modulation) data), to a write strategy circuit 42. The write strategy circuit 42 converts the modulation data into multi-pulses (a pulse train) in accordance with a predetermined recording strategy, and supplies the multi-pulses, as recording data, to the driver 22. The recording strategy is constituted by pulse widths of a leading pulse or subsequent pulses in multi-pulses and the pulse duty, for example. The recording strategy, which affects recording quality, is generally fixed to a certain optimum strategy, and may be set during optimum power control (OPC). Then, the laser light whose power was modulated according to the recording data is emitted from the LD of the optical pickup 16 onto the optical disk 10 for recording the data. After the data is recorded as described above, the optical pickup 16 emits laser light of reproducing power so as to reproduce the recorded data, and outputs the reproduced data to the RF circuit 26. The RF circuit 26 supplies the reproduction signal to the binarization circuit 34 where the data is binarized and supplied to the encode/decode circuit 36. The encode/decode circuit 36 decodes the modulation data and verifies the thus-decoded data against the recording data stored in the buffer memory 38. The result of verification is supplied to the system controller 32, which determines, in accordance with the verification result, whether to continue data recording or perform alternation operation.

With the structure as described above, when, in order to record or reproduce data with respect to the grooves, a groove track is traced and the address information is detected by the address decoding circuit 28 and supplied to the system controller 32, four consecutive waves with the same phase can be detected for one bit when the data is read correctly, and the bit value represented by these waves can be determined to be "0" or "1" in accordance with the detected phase. However, when a wave having a phase of 0 degrees or a wave having a phase of 180 degrees cannot be detected correctly, there is a possibility that a reading error has occurred. When the optical disk 10, such as an "HD DVD-R", for example, includes a check bit for CRC (a CRC bit) in the address information, the address information which was read is processed and determination is made as to whether or not a resulting CRC value corresponds to the check bit for CRC. If both do not match, it is then determined that the address information which was read is erroneous. In the CRC technique, which is a known error detection technology, data to be checked is treated as binary data and is processed using a computing expression known as a "generating polynomial" for generating check bits composed of a determined number of bits. Then, the check bits for CRC are added to the data to be checked. On the demodulation side, data to be checked is reproduced and processed using the generating polynomial, and determination is made as to whether or not the resulting CRC value and the CRC bits match, whereby presence of an error is determined. Here, a parity bit is a 1-bit CRC bit, by which a single-bit error can be detected. While three or less bit errors can be detected by CRC bits composed of nine bits, these errors cannot be corrected because it is indeterminate which bits are error bits. In particular, when the address information is composed of 24-bit data and 9-bit parity, it is not practical to search all the possible combinations of these bits in order to detect errors.

Accordingly, in the present embodiment, when the resulting CRC value does not match the CRC bits with regard to the address information which is read and it is therefore determined that a reading error has occurred, which bit position in the address information the error has occurred is then determined, to thereby enable correction of the error. The bit position where an error has occurred is specified in accordance with an amount of phase difference. More specifically, with regard to waves having a phase of 0 degrees, for example, it is possible to determine that bit data has been read correctly when the phase difference of a wobble signal with respect to a reference signal having a phase of 0 degrees is 0 for all the waves in one bit having a phase of 0 degrees. On the other hand, when the phase difference exceeding a predetermined value is detected with respect to the reference signal, it is determined that a reading error has occurred. Because four waves having a phase of 0 degrees constitute one bit data, there would be separate four phase differences for the four waves, each of which is obtained by comparing the phase of each wave with that of he reference signal. Assuming that these phase differences are represented as φi (i=1, 2, 3, 4), when any one value of φi, an added value, or an average value thereof is within a predetermined range, it is determined that data reading has been performed correctly, whereas when such a value is not within or is outside the predetermined range, it is determined that a reading error has occurred. When either one of or an average value of φi is used, the predetermined range can be set to a phase difference of ±45 degrees with respect to a reference signal. Specifically, if the phase difference falls within the range of ±45 degrees, correct data reading is determined, whereas if the phase difference exceeds 45 degrees, a reading error is determined. While the case of waves having a phase of 0 degrees has been described, waves having a phase of 180 degrees can be processed in the same manner.

Figure 2:
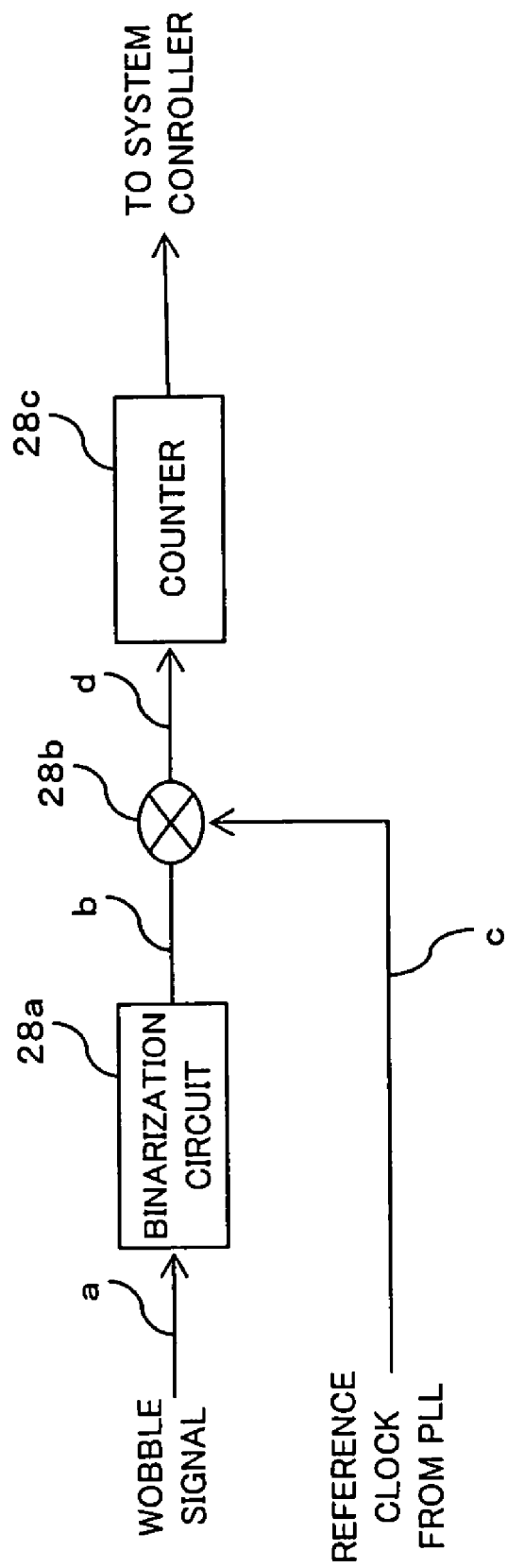
FIG. 2 is a diagram showing a structure of an address decoding circuit according to the embodiment of the present invention.

FIG. 2 shows a detection circuit for detecting an amount of phase difference, in the address decoding circuit 28. FIGS. 3A to 3D show a timing chart with respect to each part shown in FIG. 2. The detection circuit includes a binarizer 28a for binarizing a wobble signal extracted from an RF signal, an Exclusive-OR (EOR) gate 28b, and a ratio counter 28c. The ratio counter measures the ratio of pulse widths between an L (low level) signal and a H (high level) signal, as an amount of phase difference.

The binarizer 28a binarizes a wobble signal which is input and outputs a binarized signal. FIG. 3A shows an input wobble signal, and FIG. 3B shows a binarized wobble signal, which is to be supplied to the EOR gate 28b. On the other hand, a reference clock signal from a PLL circuit (not shown) is also supplied to the EOR gate 28b. FIG. 3C shows a reference clock signal. This reference clock signal also serves as a reference signal used for detecting a phase difference amount.

The EOR gate 28 performs an Exclusive-OR operation with respect to the binarized wobble signal and the reference clock signal, and outputs the resulting signal to the counter 28c. FIG. 3D shows the resulting output signal. When both the binarized wobble signal and the reference clock signal are at H or L level, the output signal is at L level. When one of the binarized wobble signal and the reference clock signal is at H level and the other is at L level, the output signal is at H level. Accordingly, when the phase of the wobble signal and the phase of the reference clock signal correspond to each other during the period Ta (corresponding to one bit data length of the address information), the output signal is continuously at the L level, and the ratio counter 28c measures only the pulse width of L pulses. Further, when the phase of the wobble signal and the phase of the reference clock signal are shifted by 180 degrees from each other during the period Tb, the output signal is continuously at H level, and the ratio counter 28c measures only the pulse width of H pulses. However, when the phase of the wobble signal and the phase of the reference clock signal shift from each other during the period Tc of FIG. 3, the output signal during this period is not continuously at H or L level and is at mixed levels of H and L at a ratio in accordance with the phase difference amount. In the illustrated example shown in FIG. 3D, an H pulse 200 is generated in L pulses, which explains a case wherein, of four waves having a phase of 0 degrees, the phase of the second wave is shifted. Accordingly, the ratio counter 28c measures this ratio of pulse widths between H and L pulses and supplies it, as an amount of phase difference, to the system controller 32.

FIGS. 4A to 4C and FIGS. 5A to 5C show in further detail a ratio, specifically, an amount of phase difference, which is measured by the ratio counter 28c. FIGS. 4A to 4C are timing charts in a case wherein a phase difference is generated between a reference signal and a binarized wobble signal during the period Ta in FIG. 3D, and correspond to FIGS. 3B to 3D, respectively. More specifically, FIG. 4 shows a binarized wobble signal, FIG. 4B shows a reference signal, and FIG. 4C shows an output of the EOR gate 28b which is to be supplied to the ratio counter 28c. When the phase of a binarized wobble signal which should originally be 0 degrees is shifted from the phase of a reference signal, the output of the EOR gate 28b is not continuously at L level and includes an H pulse having a width in accordance with the phase difference, whereby the ratio of pulse width between L and H pulses is changed. As the amount of phase difference increases, the ratio of H pulse width to L pulse width increases.

FIGS. 5A to 5C are timing charts in an example wherein a phase difference is generated between a reference signal and a binarized wobble signal during the period Tb in FIG. 3D. When the phase of a binarized wobble signal which should originally be 180 degrees is shifted from the phase of a reference signal, the output of the EOR gate 28b is not continuously at H level and includes an L pulse having a width in accordance with the phase difference, whereby the ratio of pulse width between L and H pulses is changed. As the amount of phase difference increases, the ratio of L pulse width to H pulse width increases. From the above, it can be understood that the amount of phase difference can be quantitatively evaluated in accordance with the ratio of pulse widths between L and H pulses. It should be noted that measurement of an amount of phase difference using the EOR gate 28 and the ratio counter 28c as described above is merely one example method of phase difference detection, and that a phase difference between a binarized wobble signal and a reference signal may be detected using other methods. In this regard, an arbitrary circuit for detecting a phase difference between two signals can be used.

Figure 6:
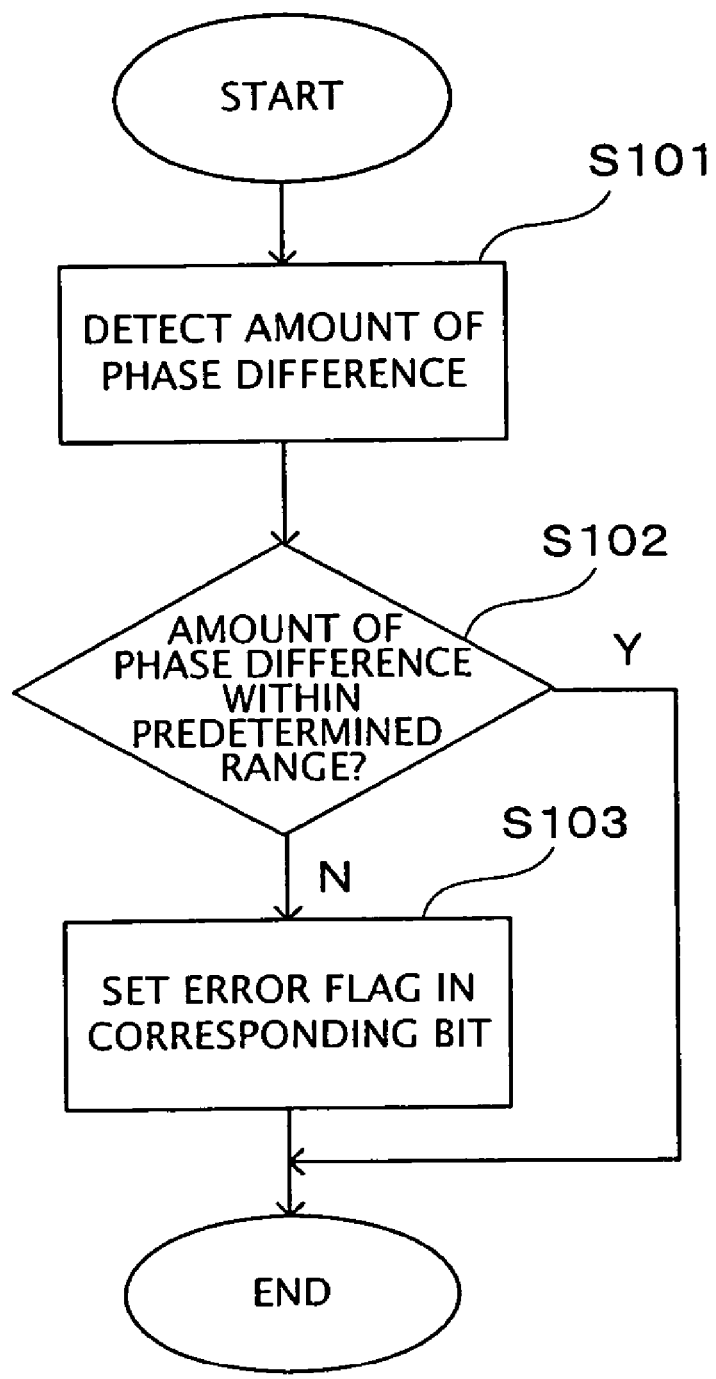
FIG. 6 is a flowchart of an error flag setting process performed by the system controller.
Figure 7:
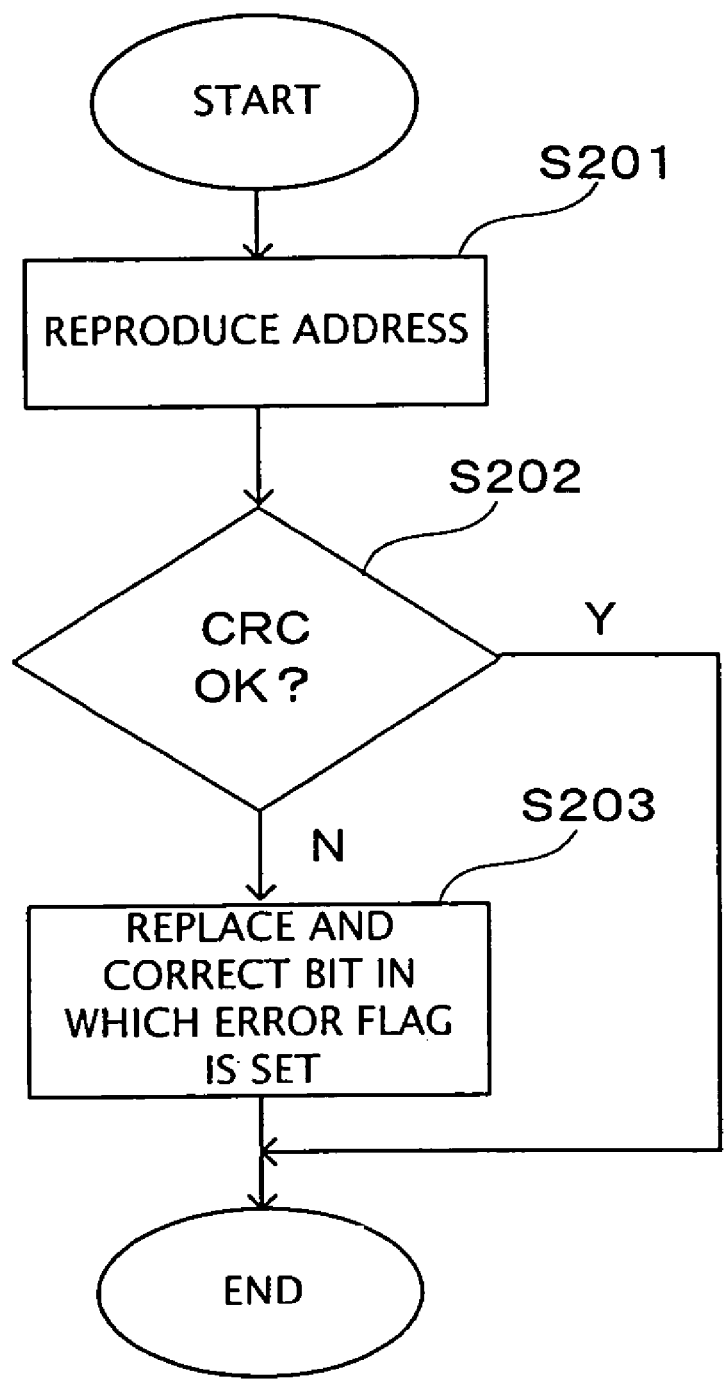
FIG. 7 is a flowchart of an address correction process performed by the system controller.
Figure 11:
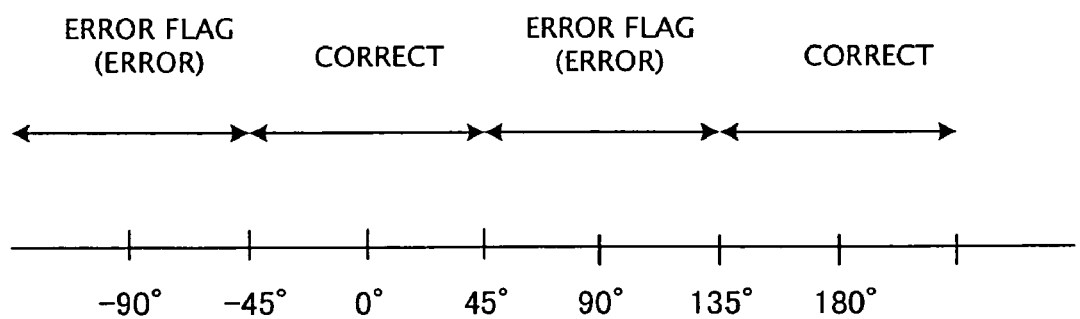
FIG. 11 is an explanatory view showing the range in which an error flag is set.

FIGS. 6 and 7 show flowcharts of a process using an amount of phase difference which is performed by the system controller 32. First, the system controller 32 detects an amount of phase difference of a wobble signal based on the ratio supplied from the ratio counter 28c (S101) More specifically, it is possible that a map indicating a relationship between the phase difference amount and the ratio is pre-stored in a memory, and the amount of phase difference corresponding to a certain ratio is read out with reference to this map or that the amount of phase difference is calculated using a computation expression between the ratio and the phase difference amount. The amount of phase difference is detected for each of four waves having the same phase. The detected amount of phase difference $\phi i$ (i=1, 2, 3, 4) is stored in a memory. Then, the system controller 32 determines whether or not the amount of phase difference which is detected falls within a predetermined range (S102). While the predetermined range may be set arbitrarily, it is preferable to set, as the predetermined range, a range of ±45 degrees with respect to each of the phase of 0 degrees and the phase of 180 degrees. When the phase difference amount is not within the predetermined range, or outside the predetermined range, then an error flag is set in a bit whose data is expressed by these four waves (S103). Here, an error flag is set, in order to perform error correction at a later stage, by replacing data values preferentially regarding the bit in which the error flag is set, in other words, in order to specify the error bit regarding which error correction is performed. The set error flag is stored in a memory. On the other hand, when the amount of phase difference falls within the predetermined range, an error bit is not determined. FIG. 11 shows a range of phase difference for setting an error flag as described above.

The amount of phase difference which is judged at step S102 may be any one of four phase difference amounts $\phi i$ or an average value of the four phase difference amounts $\phi i$, as described above. If any one of $\phi i$ is used, it is possible to compare the amount of phase difference $\phi 1$ in the first wave of the four waves or the amount of phase difference $\phi 4$ in the last of the four waves with a predetermined range, or compare the smallest or the greatest amount of phase difference among the four amounts of phase difference with a predetermined range, for example. In the present embodiment, it is determined whether or not the average value of the amounts of phase difference for four waves, $\phi ave=\Sigma\phi i/4$, falls within a range of ±45 degrees. When the average value $\phi ave$ is 30 degrees, for example, an error flag is not set, whereas when the average value $\phi ave$ is 50 degrees, an error flag is set. It is of course possible to compare the simple added value $\Sigma\phi i$ of the four phase difference amounts $\phi i$ with the predetermined range. In addition, a structure in which a reference value to be compared with the predetermined range is switched as necessary may be adopted. In such a structure, the average value of the phase differences is compared with the predetermined range for a certain optical disk whereas the greatest amount of phase difference is compared to the predetermined range for another optical disk, for example. Alternatively, the reference value may dynamically be changed for a single optical disk. In addition, it is also preferable to switch the various structures as described above in accordance with the result of error correction.

FIG. 7 shows a flowchart of address correction process which is performed by the system controller 32. The system controller 32 reproduces the address information (S201), and processes the address data using a generating polynomial to generate a CRC value and determines whether or not the resulting CRC value matches the check bit for CRC (S202). When the resulting CRC value matches the CRC bit, it can be determined that the address has been reproduced correctly and that the address is fixed. On the other hand, when CRC is NG, namely when the resulting CRC value generated using the generating polynomial does not match the CRC bit, it is determined that the address which was reproduced includes an error, and bit data replacement is then performed with respect to the error bit to which an error flag has been set in step S103 of FIG. 6, thereby performing error correction (S203). More specifically, when there is only a single error bit, error correction will be completed by replacing the data value of that error bit by 0or 1. When there are a plurality of error bits, on the other hand, data values are replaced for these error bits and then a CRC value is computed and it is determined whether or not the resulting CRC value matches the check bits for CRC. Then, if the resulting CRC does not match, the data values are replaced once again and then CRC is performed. This process is repeated until the resulting CRC value corresponds to the CRC bits. Such a repeated process is performed regarding all the possible combinations of data values for the error bits. When there are two error bits, for example, the address information is processed using a generating polynomial regarding all the possible combinations of data values, i.e. (0,0), (0,1), (1,0), and (1,1) to generate a CRC value, and it is determined for each case whether or not the resulting CRC value corresponds to the CRC bits. Here, among the above combinations, with regard to the combination which is input from the address decoding circuit 28 (i.e. the current combination), the CRC is already performed and therefore need not be repeated. Accordingly, in the case of two error bits, it is sufficient to perform the CRC regarding the remaining three combinations. Similarly, in the case of three error bits, the CRC regarding the remaining seven combinations would suffice. When data values are replaced for the error bits and the CRC is performed, a data combination regarding which the CRC is correct is determined to provide correct address information, whereupon error correction is completed.

In the above example, "HD DVD-R" in which check bits for CRC are added to the address information has been described. On the other hand, in a case of an optical disk in which data is recorded or reproduced with respect to lands and grooves, such as "HD DVD-RW", as the check bits for CRC are not added to the address information, it is preferable to correct errors in an error correction method other than that using CRC. An example of application of the present invention to HD DVD-RW will be described below.

In "HD DVD-RW", when in one groove track, with a combination bit data "0" represented by wobbles with a phase of 0 degrees both at the inner radius and the outer radius of the disk and bit data "1" represented by wobbles with a phase of 180 degrees both at the inner radius and the outer radius of the disk, address information of "0001" is embedded and, in the next groove track, address information of "0011" is embedded in a similar manner, with a combination of "0" and "1" represented by wobbles having phases of 0 and 180 degrees, respectively, then, in the land track disposed between these two groove tracks, wobbles at the inner radius and wobbles at the outer radius have opposite phases (or become out of phase) at the inversed bit position of the contiguous groove track, where a wobble signal cannot be specified. Accordingly, in HD DVD-RW, respective regions are formed where the land track address and the groove track address are to be exclusively embedded. These regions are provided such that they are displaced from each other in the track direction. When reading address information of a land track, the exclusive region for groove is skipped and the track address in the exclusive region for land that follows the exclusive groove region is read.

Figure 8:
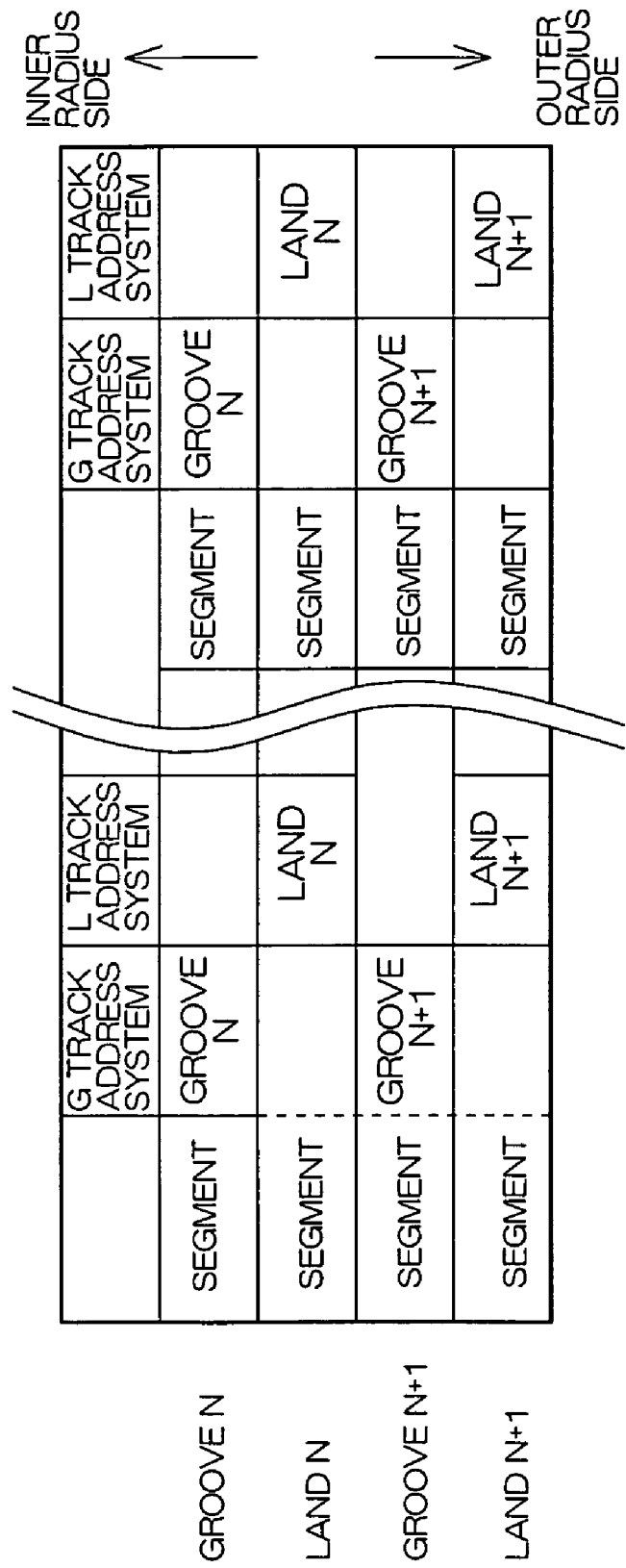
FIG. 8 is an explanatory view for the track address of an optical disk.

FIG. 8 schematically shows the address structure of HD-DVD. As shown in FIG. 8, the exclusive regions for grooves and lands are indicated as "G track address systems" and "L track address systems", respectively. Each of the groove tracks and the land tracks is divided into a plurality of segments in the track direction. The segment addresses are sequentially assigned for each track along the whole circumference of the disk and are then reset for the following track. Consequently, segment 1 of Groove N is adjacent to segment 1 of Land N, which is then adjacent to segment 1 of Groove N+1.

In the G track address system of groove N, address "N" is embedded only with wobbles having the same phase, and in the L track address system of the adjacent land N, address "N" is embedded only with wobbles having the same phase. Thus, when tracing the groove track N (groove N), the segment and a wobble signal in the G track address system are reproduced. When tracing the land track N (land N), after reading the segment, the G track address system is skipped and a wobble signal in the L track address system is reproduced, thereby obtaining address information. Here, although, in the L track address system of the Groove N, the address information is undetermined at one bit position because wobbles with opposite phases are included therein, the address information of the L track address system corresponds to the address information of the G track address system in the same track at other bit positions because the address information is embedded in both the G track address system and the L track address system after being converted into gray code. Accordingly, in the present embodiment, such correspondence between the two systems is used to correct a reading error generated in the address information of the G track address system. More specifically, when a reading error has occurred in the address information of the G track address system, the bit data at the error bit portion of address information of the G track address system is replaced by bit data of the address information of the L track address system at a bit position corresponding to the error bit, thereby correcting the error.

Figure 9:
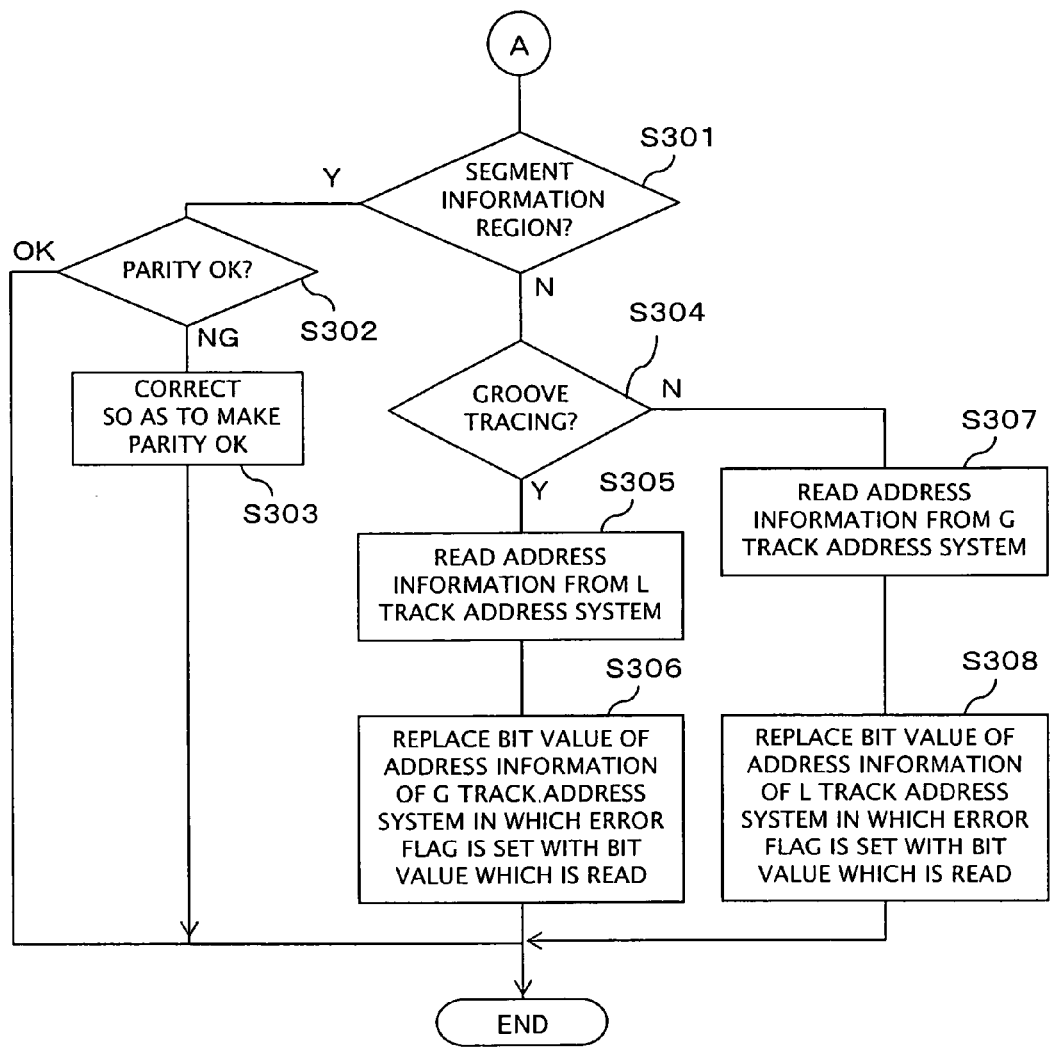
FIG. 9 is a flowchart of another error correction process performed by the system controller.

FIG. 9 shows a flowchart of an error process performed by the system controller 32. It is first determined whether or not the region which is being traced is a segment information section (S301). This determination is made because a segment information section includes a parity bit, which can be used for the error correction. If it is determined that the section is a segment information section, the parity bit is used to perform parity check CK with regard to the address information which has been read (S302). When the parity is not correct and NG is determined, it is considered that the bit in which an error flag has been set in the above step S103 includes an error, and this error bit is corrected such that the parity is made correct.

On the other hand, when the region which is being traced is not a segment information region, error correction based on parity cannot be performed because a parity bit is not added. Accordingly, error correction is performed as will be described.

It is next assumed that a groove is traced. A groove track includes G track address systems and L track address systems (see FIG. 8). When tracing a groove, the address information is demodulated from the G track address system, and the address information is also demodulated from the L track address system which includes opposite-phase wobbles and essentially provides undetermined information. While the address information which is read from the L track address system is undetermined, because the address information is coded in a gray code in which an inter-code distance is equal to 1, the address information which is read should have a value of the track address adjacent thereto on either side. Specifically, the address information which is obtained from the L track address system differs from the address information obtained from the G track address system by only one bit and the address information obtained from the L track address system is of the same value as the address information obtained from the G track address system for other bits. This means that it is possible to compare the address information obtained by demodulation of the G track address system and the address information obtained by demodulation of the L track address system and replace a bit value of an error bit of the address information obtained from the G track address system by a bit value of a corresponding bit of the address information obtained from the L track address system. For example, when the second bit of the address information obtained from the G track address system is an error bit in which an error flag is set, this error bit can be replaced by a bit value of the second bit of the address information obtained from the L track address system, whereby bit data of "0" or "1" can be fixed. It is of course not possible to perform such data replacement when the error bit position in the address information obtained from the G track address system corresponds to the bit position in the address information obtained from the L track address system which includes opposite-phase wobbles and provides undetermined data. Accordingly, error correction by means of bit data replacement as described above is effective only when the error bit position in the address information of the G track address system differs from the bit position in the address information of the L track address system which includes opposite-phase wobbles and thus provides undetermined data. The error correction as described above is similarly applicable when tracing a land track.

Based on the above-described principle, upon determining that the region which is currently being traced is not a segment information section ("NO" at step S301), the system controller 32 then determines whether or not a groove is being traced, in accordance with the polarity of the tracking servo and such criteria (S304). Then, if a groove is being traced, the address information is subsequently read from the L track address system (S305). Then, a bit value at a bit position of the address information obtained from the G track address system in which an error flag has been set is replaced by the bit value at a bit position of the address information from the L track address system corresponding to the error bit (S306). For example, when an error flag has been set in the second bit of the address information of the G track address system and a bit value of the second bit of the address information of the L track address system is "0", a bit value of the second bit of the G track address system is replaced by "0", thereby correcting the error. Further, when an error flag has been set in the third bit of the address information of the G track address system and a bit value of the third bit of the address information of the L track address system is "1", a bit value of the third bit of the G track address system is replaced by "1", thereby correcting the error.

Similarly, when tracing a land track, the address information is read from the G track address system (S307). Then, a bit value at a bit position of the address information obtained from the L track address system in which an error flag has been set is replaced by the bit value at a bit position of the address information from the G track address system corresponding to the error bit (S308). For example, when an error flag has been set in the second bit of the address information of the L track address system and a bit value of the second bit of the address information of the G track address system is "0", a bit value of the second bit of the L track address system is replaced by "0", thereby correcting the error.

Figure 10:
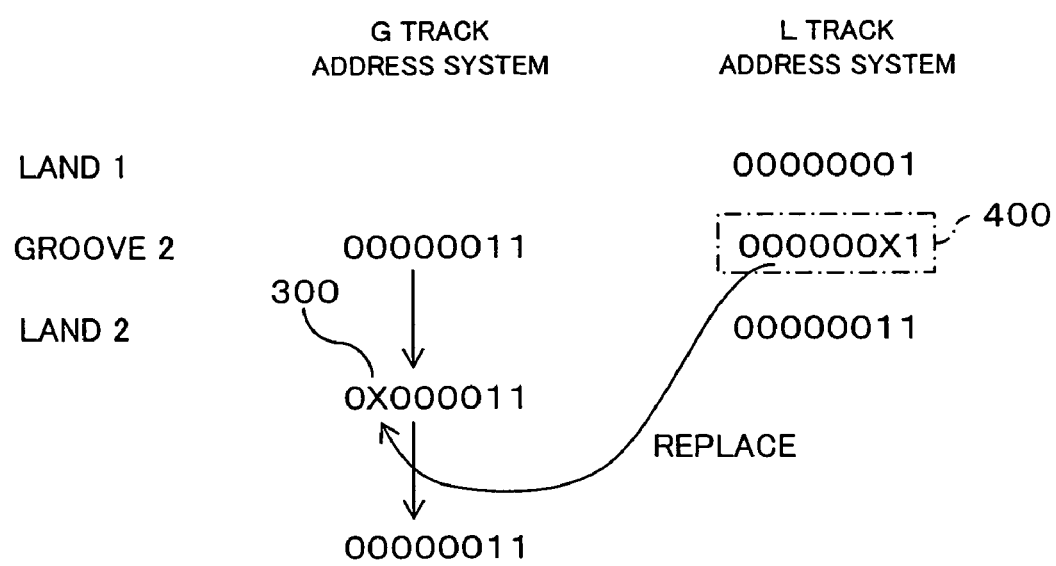
FIG. 10 is an explanatory view for the error correction process.

FIG. 10 schematically shows the correction process described above and shows addresses of the G track address system and the L track address system when the tracks are formed in the sequence of groove 1, land 1, groove 2, land 2, . . . from the inner radius to the outer radius of a disk. For convenience of explanation, the address is represented by an 8-bit gray code. Specifically, the address "00000001" is embedded in the L track address system of land 1 in the form of wobbles; the address "00000011" is embedded in the G track address system of groove 2 in the form of wobbles; and the address "00000011" is embedded in the L track address system of land 2 in the form of wobbles. In this example, groove 2 is being traced for reading the address information of the G track address system. Each bit of the address information is formed by four waves with the same phase (in-phase waves), and therefore the address should be read as "00000011" if the G track address system is correctly read. When reading the data of the seventh bit, however, the amount of phase difference which is detected is determined to be outside the predetermined range and an error flag is set in the seventh bit. In FIG. 10, the mark "X" designated by numeral 300 indicates an error bit generated in the address information of groove 2.

On the other hand, in groove 2, the L track address system 400 is formed subsequent to the G track address system. This L track address system 400 is formed by the L track address system of land 1 and the L track address system of land 2. Because the L track address system of land 1 is "00000001" and the L track address system of land 2 is "00000011", the L track address system 400 is read as "000000X1", in which "X" at the second bit indicates that data cannot be reproduced due to inclusion of opposite-phase wobbles. Thus, although the L track address system 400 of groove 2 includes an undetermined bit, the L track address system 400 has the same bit values as the G track address system of groove 2 at other bit positions. Accordingly, by replacing the error bit "X" generated at the seventh bit of the G track address system by the bit data "0" at the corresponding seventh bit of the L track address system 400, accurate address information "00000011" can be obtained.

As described above, according to the present embodiment, an amount of phase difference between the wobble signal and the reference signal is detected, and, when the amount of phase difference exceeds the predetermined range, an error flag is set in the corresponding bit because there is a high possibility that a reading error has been caused. Then, when correcting errors, data replacement is performed preferentially for the bit in which the error flag has been set, such that an error can be corrected to obtain a correct address rapidly and reliably.

While the present embodiment has been described using an optical disk device as an example, the error correction process and the error correction device of the present invention is also applicable to any devices or systems which use data which has been subjected to phase modulation. Specifically, it is determined whether or not an error flag is set in each bit in accordance with the amount of phase difference of a signal which has been subjected to phase modulation with respect to a reference signal, and an error flag is set to a bit in which the detected amount of phase difference exceeds a predetermined range. Then, when a reading error is detected by means of CRC or the like in the later data demodulation process, error correction can be performed with regard to the bit in which an error flag has been set.

Further, while in the above example, an error flag is set in a bit value for which the amount of phase difference exceeds a predetermined range, an error flag itself may assume any form. For example, either 0 (error flag reset) or 1 (error flag set) may be associated with each bit and stored in a memory, or only a bit position in which an error flag should be set may be stored in a memory. The data indicating the bit position is substantially the same as an error flag.

While the preferred embodiment of the present invention has been described using specific terms, such description is for illustrative purposes only, and it is to be understood that changes and variations may be made without departing from the spirit or scope of the appended claims.

What is claimed is:

1. A device for correcting an error of a data value in a modulation method in which a data value is expressed by a first phase and a second phase which is shifted from the first phase by 180 degrees, the device comprising:

determination means for determining whether or not a phase difference between a modulation signal and a reference signal is outside a predetermined range with respect to the first phase or the second phase;

setting means for setting an error flag in a data value for which the phase difference is determined to be outside the predetermined range; and correction means for replacing the data value in which the error flag is set for error correction.

2. A device according to claim 1, wherein
the first phase is 0 degrees and the second phase is 180 degrees, and the predetermined range is a range of ±45 degrees with respect to the 0 degrees or the 180 degrees.

3. An optical disk device for recording or reproducing data with respect to grooves of an optical disk in which address information is embedded by forming the grooves in wobbles, the wobbles forming data of one bit using N (N≧2) waves with the same phase and also by a modulation method in which a data value is expressed by a first phase and a second phase which is shifted from the first phase by 180 degrees, the optical disk device comprising:

determination means for determining whether or not at least any one of N phase differences between a signal obtained by reproducing the wobbles and a reference signal is outside a predetermined range with respect to the first phase or the second phase; and address correction means for replacing data of a bit in which the phase difference is determined to be outside the predetermined range for correcting the data.

4. An optical disk device according to claim 3, wherein a predetermined check bit for CRC is added to the address information, and when a resulting CRC value of address information obtained by reproducing the wobbles does not match the check bit for CRC, the address correction means replaces data of the bit in which the phase difference is determined to be outside the predetermined range such that a resulting CRC value matches the check bit for CRC.

5. An optical disk device according to claim 3, wherein the address information is embedded by forming the grooves and lands in wobbles and is embedded after being converted into a gray code in which a distance between codes for two consecutive address values is equal to 1, and the address information includes a parity bit, and the address correction means replaces data of a bit in which the phase difference is determined to be outside the predetermined range such that the bit data matches the parity bit.

6. An optical disk device according to claim 3, wherein the address information is embedded by forming the grooves and lands in wobbles, the address information being embedded after being converted into a gray code in which a distance between codes for two consecutive address values is equal to 1, the address information of the groove includes two address systems, which are a groove track address system defined by in-phase wobbles where the phase of the wobble on the inner radius side and the phase of the wobble on the outer radius side, forming the groove, are identical, and a land track address system defined by including opposite-phase wobbles where the phase of the wobble on the inner radius side and the phase of the wobble on the outer radius side, forming the groove, are reversed, and the address information of the lands includes two address systems, which are a land track address system defined by in-phase wobbles where the phase of the wobble on the inner radius side and the phase of the wobble on the outer radius side, forming the land, are identical, and a groove track address system defined by including opposite-phase wobbles where the phase of the wobble on the inner radius side and the phase of the wobble on the outer radius side, forming the land, are reversed, and the address correction means replaces data of a bit in which the phase difference is determined to be outside the predetermined range by using the address information obtained from a wobble signal which is obtained by reproducing the land track address system when tracing a groove track and replaces data of the bit in which the phase difference is determined to be outside the predetermined range by using the address information obtained from a wobble signal which is obtained by reproducing the groove track address system when tracing a land track.

7. An optical disk device according to claim 3, wherein the first phase is 0 degrees and the second phase is 180 degrees, and the predetermined range is a range of ±45 degrees with respect to the 0 degrees or the 180 degrees.

8. An optical disk device for recording or reproducing data with respect to grooves of an optical disk in which address information is embedded by forming the grooves in wobbles, the wobbles forming data of one bit using N (N≧2) waves with the same phase and also by a modulation method in which a data value is expressed by a first phase and a second phase which is shifted from the first phase by 180 degrees, the optical disk device comprising:

determination means for determining whether or not an average value of N phase differences between a signal obtained by reproducing the wobbles and a reference signal is outside a predetermined range with respect to the first phase or the second phase; and address correction means for replacing data of a bit in which the phase difference is determined to be outside the predetermined range for correcting the data.

9. An optical disk device according to claim 8, wherein a predetermined check bit for CRC is added to the address information, and when a resulting CRC value of address information obtained by reproducing the wobbles does not match the check bit for CRC, the address correction means replaces data of the bit in which the phase difference is determined to be outside the predetermined range such that a resulting CRC value matches the check bit for CRC.

10. An optical disk device according to claim 8, wherein the address information is embedded by forming the grooves and lands in wobbles and is embedded after being converted into a gray code in which a distance between codes for two consecutive address values is equal to 1, and the address information includes a parity bit, and the address correction means replaces data of a bit in which the phase difference is determined to be outside the predetermined range such that the bit data matches the parity bit.

11. An optical disk device according to claim 8, wherein the address information is embedded by forming the grooves and lands in wobbles, the address information being embedded after being converted into a gray code in which a distance between codes for two consecutive address values is equal to 1, the address information of the groove includes two address systems, which are a groove track address system defined by in-phase wobbles where the phase of the wobble on the inner radius side and the phase of the wobble on the outer radius side, forming the groove, are identical, and a land track address system defined by including opposite-phase wobbles where the phase of the wobble on the inner radius side and the phase of the wobble on the outer radius side, forming the groove, are reversed, and the address information of the lands includes two address systems, which are a land track address system defined by in-phase wobbles where the phase of the wobble on the inner radius side and the phase of the wobble on the outer radius side, forming the land, are identical, and a groove track address system defined by including opposite-phase wobbles where the phase of the wobble on the inner radius side and the phase of the wobble on the outer radius side, forming the land, are reversed, and the address correction means replaces data of a bit in which the phase difference is determined to be outside the predetermined range by using the address information obtained from a wobble signal which is obtained by reproducing the land track address system when tracing a groove track and replaces data of a bit in which the phase difference is determined to be outside the predetermined range by using the address information obtained from a wobble signal which is obtained by reproducing the groove track address system when tracing a land track.

12. An optical disk device according to claim 8, wherein the first phase is 0 degrees and the second phase is 180 degrees, and the predetermined range is a range of ±45 degrees with respect to the 0 degrees or the 180 degrees.

13. An optical disk device for recording or reproducing data with respect to grooves of an optical disk in which address information is embedded by forming the grooves in wobbles, the wobbles forming data of one bit using N (N≧2) waves with the same phase and also by a modulation method in which a data value is expressed by a first phase and a second phase which is shifted from the first phase by 180 degrees, the optical disk device comprising:

determination means for determining whether or not an added value of N phase differences between a signal obtained by reproducing the wobbles and a reference signal is outside a predetermined range with respect to the first phase or the second phase; and address correction means for replacing data of a bit in which the phase difference is determined to be outside the predetermined range for correcting the data.

14. An optical disk device according to claim 13, wherein a predetermined check bit for CRC is added to the address information, and when a resulting CRC value of address information obtained by reproducing the wobbles does not match the check bit for CRC, the address correction means replaces data of the bit in which the phase difference is determined to be outside the predetermined range such that a resulting CRC value matches the check bit for CRC.

15. An optical disk device according to claim 13, wherein the address information is embedded by forming the grooves and lands in wobbles and is embedded after being converted into a gray code in which a distance between codes for two consecutive address values is equal to 1, and the address information includes a parity bit, and the address correction means replaces data of a bit in which the phase difference is determined to be outside the predetermined range such that the bit data matches the parity bit.

16. An optical disk device according to claim 13, wherein the address information is embedded by forming the grooves and lands in wobbles, the address information being embedded after being converted into a gray code in which a distance between codes for two consecutive address values is equal to 1, the address information of the groove includes two address systems, which are a groove track address system defined by in-phase wobbles where the phase of the wobble on the inner radius side and the phase of the wobble on the outer radius side, forming the groove, are identical, and a land track address system defined by including opposite-phase wobbles where the phase of the wobble on the inner radius side and the phase of the wobble on the outer radius side, forming the groove, are reversed, and the address information of the lands includes two address systems, which are a land track address system defined by in-phase wobbles where the phase of the wobble on the inner radius side and the phase of the wobble on the outer radius side, forming the land, are identical, and a groove track address system defined by including opposite-phase wobbles where the phase of the wobble on the inner radius side and the phase of the wobble on the outer radius side, forming the land, are reversed, and the address correction means replaces data of a bit in which the phase difference is determined to be outside the predetermined range by using the address information obtained from a wobble signal which is obtained by reproducing the land track address system when tracing a groove track and replaces data of a bit in which the phase difference is determined to be outside the predetermined range by using the address information obtained from a wobble signal which is obtained by reproducing the groove track address system when tracing a land track.

\* \* \* \* \*